UNITED STATES PATENT OFFICE.

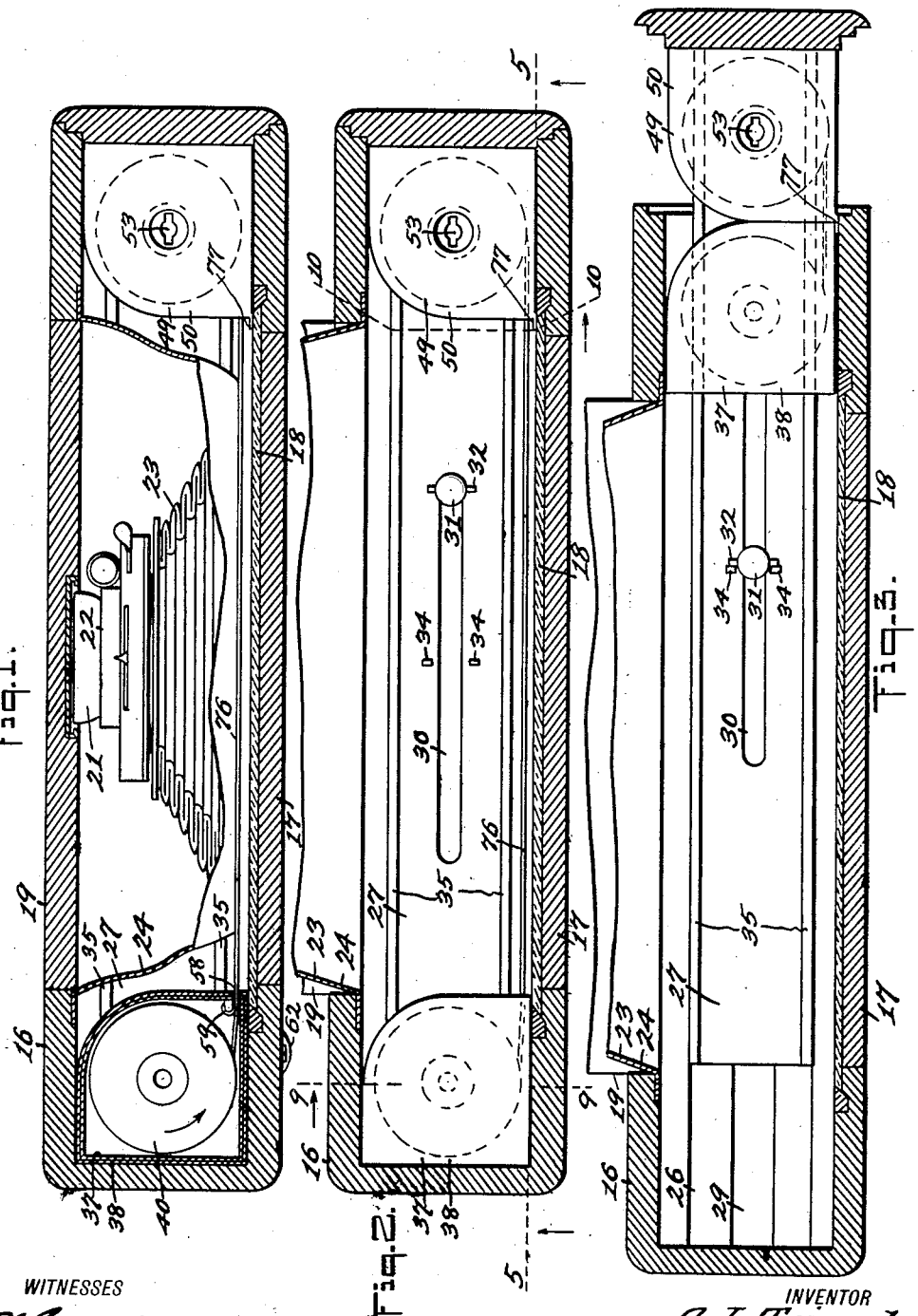

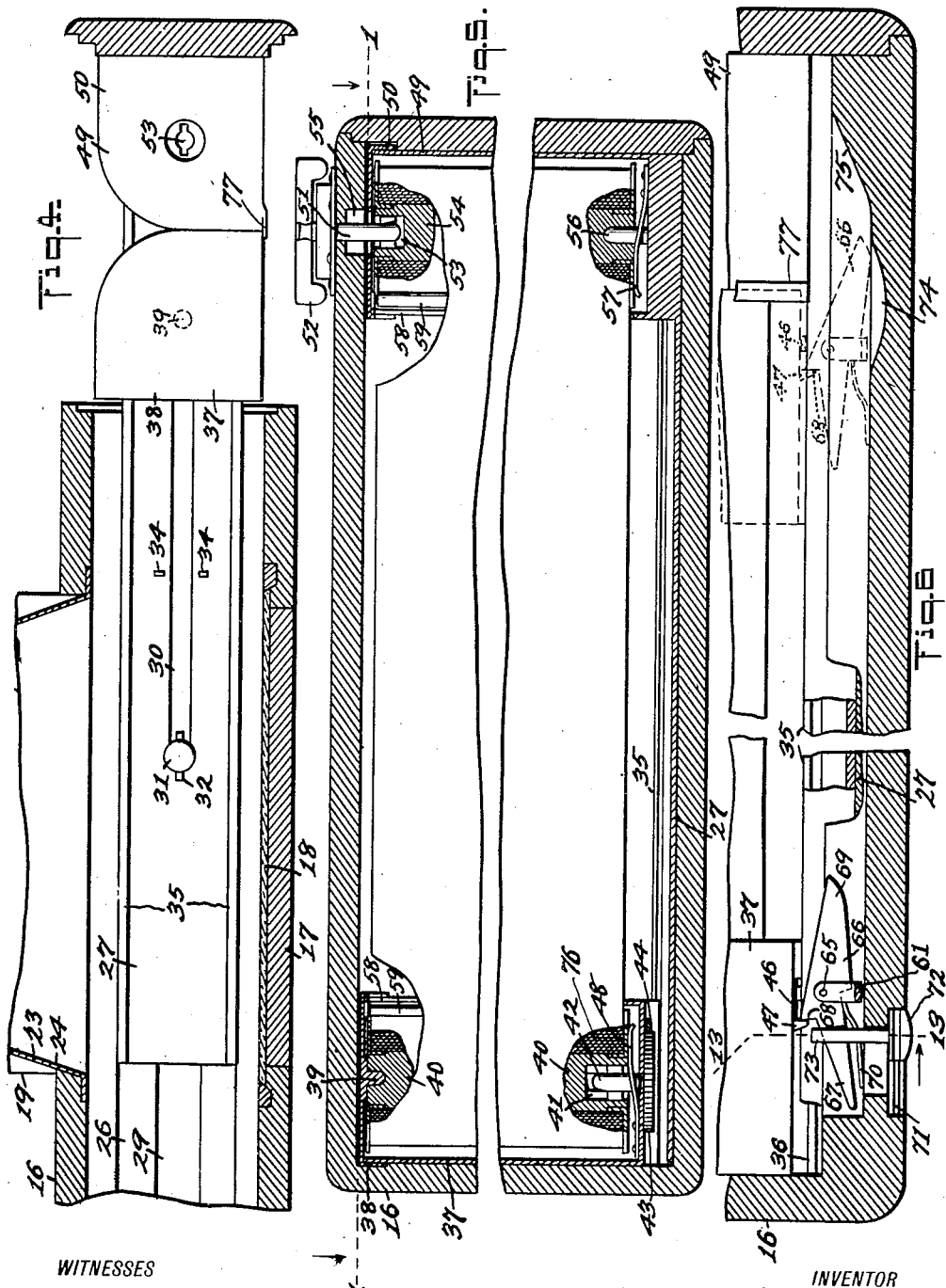

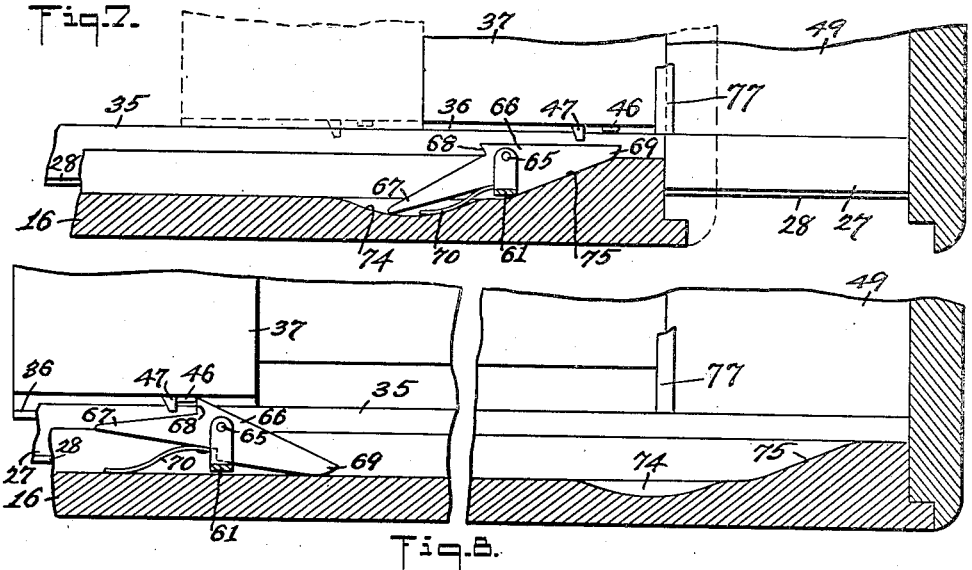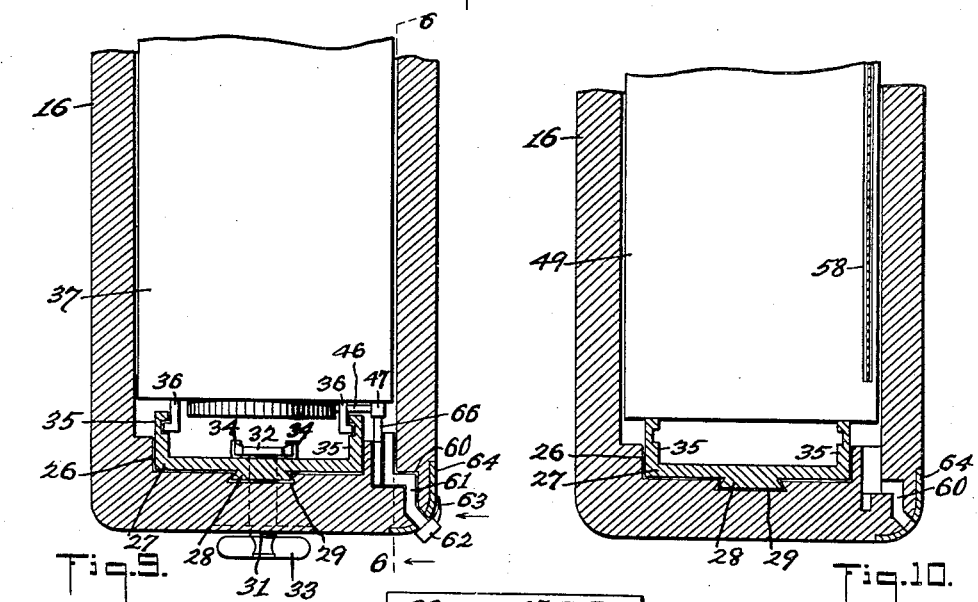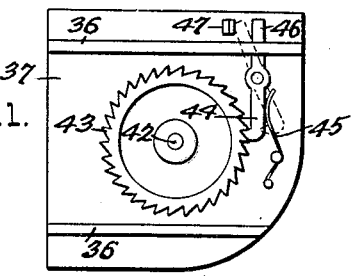

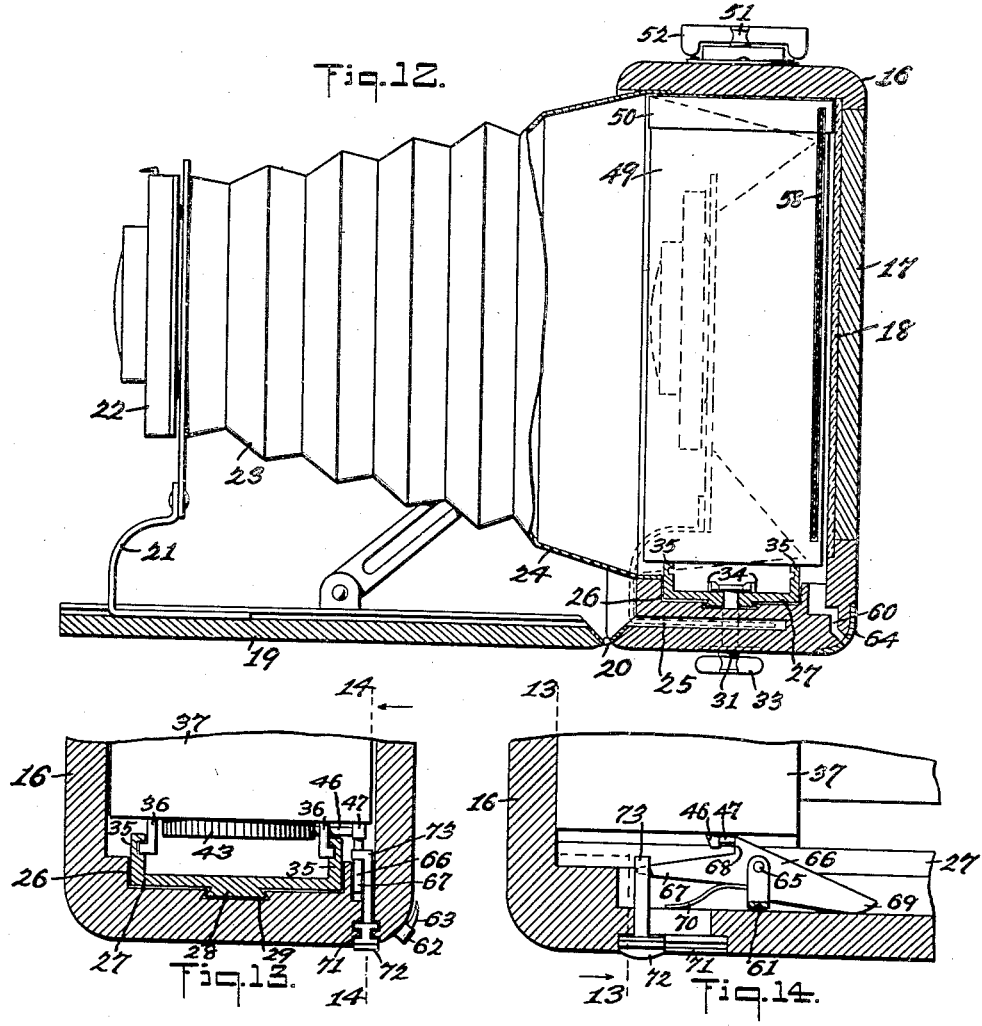

ALFRED L. TRIPPEL, OF MIAMI, ARIZONA.

CAMERA.

1,232,125.     Specification of Letters Patent.     Patented July 3, 1917.

Application filed October 25, 1916. Serial No. 127,543.

*To all whom it may concern:*

Be it known that I, ALFRED L. TRIPPEL, a citizen of the United States, and a resident of Miami, in the county of Gila and State of Arizona, have invented certain new and useful Improvements in Cameras, of which the following is a specification.

My invention relates to film cameras, and the main object thereof is to provide means whereby the photographic field of a desired subject may be determined by means of a finder in the usual manner or by use of the focusing ground glass as in a plate camera.

A further object is to provide manually operable means whereby the unwinding of the unexposed film from its spool may be permitted in the usual manner or prevented, and also to provide means insuring the movement of the said spool toward the re-wind spool in the re-winding of the latter when the said unwinding is prevented, thereby carrying the film and said first named spool from the intercepting position between the lens and the ground glass.

A further object is to provide means for limiting this movement of the spools toward each other, whereby the size of an exposed portion of film may be controlled, and a further object is to provide means automatically releasing the spool having the unexposed film thereon whereby the film may be unwound therefrom after said spool has reached its definite position determined by said limiting means.

A further object is to provide means permitting the withdrawal of the re-wind spool from the camera for re-winding the film thereon, and also means limiting such withdrawal, said last named means being rendered inoperative at will in order to withdraw both spools from the camera for reloading.

And a further object is to adapt the bellows to the foregoing results in cameras, and also the lens carrier, if such adaptation is found necessary, as I do not desire to confine myself to any type of camera now known to me nor to the particular type illustrated, although the structure of the latter embodies a practical reduction to practice with respect to the bellows and to the lens carrier.

My invention is fully described in the following specification, of which the accompanying drawings form a part, in which like characters refer to like parts in each of the views, and in which:—

Figure 1 is a section taken through one embodiment of my invention, as on the line 1—1 of Fig. 5, partly broken away;

Fig. 2 is a similar section, with the front door open and the bellows extended, shown fragmentarily;

Fig. 3 is a view similar to Fig. 2 with the re-wind spool carrier withdrawn from the camera, for film re-wind;

Fig. 4 is a similar view with both spool carriers withdrawn from the camera, for film reloading;

Fig. 5 is a section taken on the line 5—5 of Fig. 2, with the film broken away to show details in section;

Fig. 6 is an enlarged fragmentary section taken on the line 6—6 of Fig. 9;

Fig. 7 is a similar view but with certain parts in different positions;

Fig. 8 is a similar view but with certain parts in still other positions;

Fig. 9 is a fragmentary section taken on the line 9—9 of Fig. 2;

Fig. 10 is a section taken on the line 10—10 of Fig. 2;

Fig. 11 is a bottom plan view of one of the spool carriers, that carrying the unexposed film;

Fig. 12 is a central, vertical, section through the camera, with the bellows extended;

Fig. 13 is a fragmentary section taken on the line 13—13 of Fig. 14;

Fig. 14 is a similar section taken on the line 14—14 of Fig. 13; and

Fig. 15 is a fragmentary elevation of the rear of the camera.

Referring to the drawings, 16 represents a casing having a removable back 17, a ground glass focusing screen 18, a front door 19 hinged at 20, supporting an adjustable carrier 21 for the lens and shutter housing 22, the latter being connected with the casing 16 by means of a bellows 23 in the usual manner but, preferably, provided with a portion 24 adjacent the casing having no folds or undulations for a reason to be explained, and I provide a recess 25 for the horizontal lower portion of the carrier 21 whereby said carrier may be moved into the casing and its lower guided portion rest within the recess 25, said recess not permitting the entrance of light to the interior of the casing 16.

The interior bottom of the casing 16 is longitudinally channeled at 26 to receive a slide plate 27 having a dove-tailed rib 28 on the under side thereof slidably held in a similarly shaped groove 29 in the bottom of the casing, said slide plate 27 being slotted at 30 for a rod 31 rotatably held in the bottom of the casing and provided with a transverse rod 32 at its upper end and a knob 33 at its lower end, said transverse rod 32 being adapted to engage two stops 34 on the upper surface of the slide plate when arranged transversely of said slot to limit movement of said slide plate but permitting free movement of said slide plate when said transverse rod 32 is arranged longitudinally of said slot by rotation of the vertical rod 31 by means of the knob 33.

The slide plate 27 is provided with vertical edge members 35 having, each, a groove in its inner surface serving as guides for angular members 36 on the bottom of a film box 37 provided with a removable cap 38 carrying a central post 39 entering a suitable bore in a spool 40 for the unexposed film, the lower end of said spool having a winged socket 41 arranged centrally therein for the reception of a similarly winged post 42 rotatably held in the bottom of the box 37 and provided with a ratchet wheel 43 exteriorly of said box normally held against rotation by means of a pawl 44 and spring 45, said pawl having an extension 46 passed through a slot in one of the angular members 36 adapted to be forced against a stop 47 on the bottom of the box 37 of a greater vertical dimension than the vertical thickness of the pawl arm 46 for a reason to be explained, and I provide a spring 48 for braking the spool 40 and for holding the same against vertical movement.

The slide plate 27 is of a length approximating that of the casing interior and the right hand end, as illustrated, carries an integral film box 49 provided with a removable cap 50 having an opening therethrough for the passage of a re-wind key 51 having a handle 52 thereon and normally engaged within a winged recess 53 in the upper end of the re-wind spool 54 in the box 49 but, whenever desired, said key 51 may be moved upwardly out of spool engagement the winged end of said key being received within a recess 55 within the casing 16. The spool 54 is rotatably held on a post 56 in the bottom of the box 49 and frictionally held in position by means of a spring 57, Fig. 5, and said boxes 37 and 49 are provided with film slots 58 and anti-friction rollers 59 adjacent thereto.

The end of the casing 16 adjacent the film box 49 is separable from the casing and secured to said film box and thus to the slide plate 27 whereby said boxes on said slide plate may be moved longitudinally of the casing, with the rod 31 in locking position to move the film box 49 outwardly of the casing and the film box 37 clear of the ground glass to permit focusing thereon, and with the rod 31 in releasing position to withdraw both film boxes 37 and 49 from the casing for reloading, Figs. 3 and 4, it being understood that the re-wind key 51 is previously disengaged from the re-wind spool 54 and from the film box 49.

By reference to Figs. 9, 10 and 12, it will be seen that the rear lower corner of the casing 16 is provided with a stepped slot 60 so formed to exclude light from the casing and extending the greater part of the length of the casing, a stepped bar 61 being slidably held in said slot and provided with a knob 62 at its outer end and an indicator 63 movable over a graduated scale 64, whereas the inner end carries a pivot pin 65 for a trip 66 having a tapered left hand end 67 forming a shoulder 68 and a pointed right hand end 69 rounded as shown, said trip being movable in the plane of the pawl arm 46 and of the stop 47 whereby it may engage either as will be explained, a spring 70 normally maintaining the tapered end 67 in raised position, Fig. 8, and it will be seen that the trip may be accurately adjusted with respect to the length of the casing by means of the indicator and scale.

Also slidably adjustable in a slot 71 in the same corner of the casing, to the left of the slot 60, is a button 72 carrying a bar 73 the upper end of which is inwardly hooked to extend over the path of movement of the trip 66 whereby the latter may be rocked on its pivot to carry its shoulder 68 below the pawl arm 46 though not below the stop 47, Fig. 6, when the trip is in its extreme left hand position thereby permitting said pawl arm to move away from said stop, by means of the spring 45 and thus permit the pawl 44 to engage with the ratchet 43 to prevent rotation of the film spool 40 for a reason to be explained and, when said hooked bar 73 is out of engagement with the trip the rounded end 69 thereof bears on the bottom of the casing, Fig. 8, with the trip shoulder raised to engage the pawl arm 46 to disengage the pawl 44 from the ratchet 43 and thus permit rotation of the spool 40.

The bottom of the casing, adjacent its right hand end, is provided with a depression 74 in the path of movement of the trip and with an inclined projection 75 to the right of said depression, the end 69 of the trip being adapted to ride up the incline 75 to carry the trip shoulder 68 below both the pawl arm 46 and the stop 47 to permit right hand movement of the film box 37 beyond said trip, the trip end 67 passing into the depression 74 in such trip movement, Fig. 7.

To load the camera, the trip 66 is moved to the position shown in Fig. 7 by means of its knob 62, it being assumed that when the film boxes 37 and 49 had been inserted into the casing 16 they had been together as shown in Figs. 3 and 4, after which the knob 33 is rotated to clear the rod 32 from the stops 34, thereby permitting the withdrawal of the slide plate and the boxes 37 and 49 carried thereby to the limit of the slot in the former, into the position shown in Fig. 4, at which time the caps may be removed from the film boxes, a film roll 76 placed in the box 37, the film threaded through the slots 58 and the free end of the film given one or two turns on the empty spool in the box 49.

The caps may now be placed on the respective film boxes and the slide plate forced entirely within the casing 16, the film boxes still being in juxtaposition, after which the re-wind key 51 is moved into engagement with the spool 54, it being understood that the front of the casing had previously been dropped and the lens carrier moved outwardly thereon to carry said carrier out of obstructing position in the path of film box movement.

The trip 66 may now be moved toward the left of the casing with the result that the shoulder 68 thereon engages the pawl arm 46 and forces the same against the stop 47 to release the ratchet 43 and thus permit free rotation of the unexposed film spool 40 when the film box 37 is moved to the left by means of the trip handle and the camera is now in readiness for use in the manner of a non-focusing camera, a length of exposed film being wound on the spool 49 after each exposure, the spool 40 being still rotatable.

When it is desired to expose but a portion of the conventional amount of film, the trip 66 is moved toward the right to a point determined upon and indicated on the scale 64, this trip movement permitting the pawl to move into ratchet engagement to prevent unrolling of the unexposed film from the roller in the film box 37 and, if the re-wind key be now actuated, the film box 37 is drawn to the right until the trip is reached by the pawl arm 46, the latter being then released from the ratchet 43 to permit film feeding after each exposure of the adjusted length of film, and the stop 47 prevents any further movement of the film box 37 to the right inasmuch as the strain of the film re-wind is relieved from the box 37 by the release of the pawl from the ratchet.

If the trip had been moved to nearly its right hand limit the film boxes would have been brought in juxtaposition and thus permit focusing on the ground glass and thereafter the trip could have been moved toward the left for its full limit or for a desired portion thereof, thereby arranging a corresponding length of film for exposure because of the fact that the pawl was disengaged from the ratchet and free rotation of the spool 40 was possible, this being the position of the parts when the camera is to be used with a finder and not for focusing on the ground glass.

When the latter use is desired, the hooked bar 73 is moved to the right, Fig. 6, to rock the trip to carry the shoulder thereon below the pawl arm but not below the stop 47 thus locking the spool 40 against film unwinding and, after the film between the boxes 37 and 49 had been exposed, the actuation of the re-wind key would draw the film boxes into juxtaposition, as shown in Fig. 3, after the slide plate had been moved outwardly until prevented from further movement by the stops 34, ground glass focusing now being permitted, and, thereafter, the trip not now engaging the pawl arm the movement of the trip to the left, after having been carried with the film box 37 in the right hand movement of the latter, will carry the film box 37 back to the position shown in Figs. 1 and 2 and unwind the length of film from the re-wind spool just wound thereon.

The hooked bar 73 is only for the purpose of changing the camera from a ground glass focusing to a non-focusing condition, or the reverse, by merely controlling the unwinding of the unexposed film from the spool 40, and it will be noted that the action of the trip is entirely automatic because of the hooked bar 73 and the incline 75.

If it is desired to use the camera as a non-focusing one, the hooked bar 73 is moved to the left to permit the trip to move to normal position, from that shown in full lines at the left of Fig. 6, after which the trip is moved slightly to the right to carry its shoulder 68 to the right of the pawl arm and, upon a left hand movement of the trip, the pawl is disengaged from the ratchet and the film may be unwound from the spool 40 after each exposure by winding each exposed portion on the re-wind spool 54.

It will be understood that I will make the camera light proof, as by felt or other packings as commonly used although not illustrated, and I also provide a lip 77 on the film box 49 and cover 50, if desired, to lap over the film box 37 and cover 38 when the said boxes are in juxtaposition, thereby excluding light from the film at the junction of the boxes.

The main structural features consist of the film boxes, the means for withdrawing one or both from the casing, the means for adjusting the same with respect to each other, the trip, the trip actuating means, and the control of the rotation of the film spool 40, the film box 37 being moved toward the box 49 by means of the interposed film in the winding of the latter on the spool 54, this being possible only when the trip permits it, and said trip is carried to the right by the movement of the film box 37 in that direction.

In cameras of the hand type the bellows is secured closely adjacent the rear of the casing but, obviously, this would prevent the sliding movement of the film box 37 and I therefore provide the flexible portion 24 secured to the front of the casing and which portion is turned outside in when the camera is folded, and I may make the same in any way that will permit the film box movement and render the casing interior light proof.

While I have shown entirely practical structural details, I do not desire to limit myself thereto as changes may be made thereover without departing from the spirit of the invention or sacrificing its advantages and still come within the scope of the appended claims.

Having fully described my invention, what I claim as new, and desire to secure by Letters Patent, is:—

1. In a camera, including a lens and a focusing screen; an unexposed film carrier, a re-wind film carrier, a re-wind key for said last named carrier, and means operable by said key for moving one of said carriers across the face of said screen to expose a desired portion thereof to said lens.

2. In a camera, including a lens and a focusing screen; a film box for unexposed film, a supplemental film box for the exposed film, means for normally maintaining said boxes at opposite ends of said camera to normally hold the film between said lens and screen, a re-wind key for one of said film boxes, and means for preventing the unwinding of the film from the other of said boxes whereby the latter will be moved toward the re-wind box in the rotation of said key to expose a desired portion of said screen to said lens.

3. In a camera, including a lens and a focusing screen; a slide plate, a film box secured to one end thereof, a supplemental film box slidably mounted on said plate, a re-wind key for one of said boxes, and means for preventing unwinding of said film from the other of said boxes whereby the latter will be drawn toward the former in the re-winding of the film in the former to expose a desired portion of said screen to said lens.

4. In a camera, including a lens and a focusing screen; a slide plate, a film box secured at one end thereof, a supplemental film box slidably mounted on said plate, means permitting the unwinding of a film from one of said boxes by rewinding the same in the other box, and means for preventing such unwinding whereby said boxes will approach each other in the film re-wind.

5. In a camera, including a lens and a focusing screen; a slide plate movable through a side of said camera, a film box secured at one end thereof, a supplemental film box slidable on said plate, means for preventing unwinding of the film from one box in the re-winding in the other box to move said boxes toward each other, and controllable means for limiting plate movement outwardly of said camera.

6. In a camera, including a lens and a focusing screen; a slide plate movable through a side of said camera, a film box secured at one end thereof, a supplemental film box slidable on said plate, means for preventing unwinding of the film from one box in the re-winding in the other box to move one of said boxes toward the other, and controllable means for limiting the movement of said movable box.

7. In a camera, including a lens and a focusing screen; a slide plate movable through a side of said camera, a film box secured at one end thereof, a supplemental film box slidable on said plate, means for preventing unwinding of the film from one box in the re-winding in the other box to move one of said boxes toward the other, controllable means for limiting plate movement to permit the removal of one box from said camera, and controllable means for permitting the removal of both boxes from the camera, said last named means operating on one of said boxes.

8. In a camera, including a lens and a focusing screen; a slide plate, a film box secured at one end thereof, a supplemental film box slidable on said plate, means preventing the unwinding of the film from one box in the re-winding in the other box to move one of said boxes toward the other, and controllable means for rendering said preventive means inoperative to permit film unwinding from one of said boxes to prevent sliding movement thereof toward the other box.

9. In a camera, including a lens and a focusing screen; a slide plate, a film box secured at one end thereof, a supplemental film box slidable on said plate, means preventing the unwinding of the film from one box in the re-winding in the other box, controllable means for rendering said preventive means inoperative, and controllable means for rendering said last named means inoperative.

10. In a camera, including a lens and a focusing screen; a slide plate, a film box secured at one end thereof, a supplemental film box slidable on said plate, means preventing the unwinding of the film from one box in the re-winding in the other box, controllable means for rendering said preventive means inoperative and for locking said slidable box against movement, and controllable means for rendering said last named means inoperative with respect to said preventive means while operative as a lock for said sliding box.

11. In a camera, including a lens, a carrier therefor, a bellows, and a focusing screen; a slide plate, a film box secured at one end thereof, a supplemental film box slidable on said plate, means for drawing said slidable box toward the other box to expose the screen to said lens, and means for holding said bellows out of the path of movement of said slide plate and slidable box.

12. In a camera, including a lens, a carrier therefor, a bellows, and a focusing screen; a slide plate, a film box secured at one end thereof, a supplemental film box slidable on said plate, means for moving said slidable box toward and from the other box, and a flexible light-proof member connecting said bellows with the front of said camera whereby said bellows will not interfere with the movement of said slidable box.

13. As an article of manufacture, for use in a film camera, a slide plate, a film box carried at one end thereof, a supplemental film box slidable on said plate toward and from said first named box, a film spool in each box, said first named box having an opening for the admission of a rewind key, and spring controlled means on the slidable box for preventing the unwinding of the spool therein.

ALFRED L. TRIPPEL.